US005680489A

United States Patent [19]

Kersey

[11] Patent Number: 5,680,489
[45] Date of Patent: Oct. 21, 1997

[54] OPTICAL SENSOR SYSTEM UTILIZING BRAGG GRATING SENSORS

[75] Inventor: Alan D. Kersey, Fairfax Station, Va.

[73] Assignee: The United States of America as represented by the Secretary of the Navy, Washington, D.C.

[21] Appl. No.: 672,910

[22] Filed: Jun. 28, 1996

[51] Int. Cl.⁶ ................................................ G02B 6/26
[52] U.S. Cl. ........................ 385/12; 356/354; 356/35.5
[58] Field of Search ................................ 356/354, 35.5;
750/227.18, 227.14, 227.19, 227.23, 227.27;
385/12, 37

[56] References Cited

U.S. PATENT DOCUMENTS 4,649,529  3/1987  Avicola .................................. 385/12
5,011,262  4/1991  Layton .................................. 385/12

*Primary Examiner*—John Ngo
*Attorney, Agent, or Firm*—Thomas E. McDonnell; George Jameson

[57] ABSTRACT

An optical system for detecting perturbations indicative of the performance of the piece of equipment being monitored is disclosed. The optical system comprises sensors each of which use Bragg gratings induced therein and wherein the Bragg gratings are arranged into a preselected distribution and each Bragg grating returns, when subjected to incident light, a narrowbeam signal identified by a predetermined wavelength. The optical system utilizes at least one interferometer whose operation is interlinked with optical multiplexing techniques, such as differentiate-cross-multiplying and time-division multiplexing.

17 Claims, 8 Drawing Sheets

OPTICAL SENSOR SYSTEM UTILIZING BRAGG GRATING SENSORS

BACKGROUND OF THE INVENTION

1. Field of the Invention

The present invention relates to sensor systems and, more particularly, to a sensor system utilizing Bragg grating sensing elements for the measurement of weak time-varying measurand fields, such as acoustic pressure, vibrations and magnetic fields.

2. Description of the Prior Art

Sensor systems are known that monitor for acoustic emissions or variations in electrical or magnetic fields created by and/or developed from equipment, materials under test, structures and structural components. The monitoring thereof is used as an analytical method to evaluate the performance of the monitored devices. Such sensor systems commonly employ a number of sensors which are required to instrument a complex piece of machinery, such as a gear box. Fiber optic sensors responsive to optical multiplexing techniques are commonly employed because they offer a means to allow for the implementation of a relatively large number of sensors to be located on the structure. Sensor systems for multi-point sensing applications may use fiber Bragg grating (FBG) sensors described in the technical article of G. Meitz, W. W. Morey, and W. H. Glenn, entitled "Formation of Bragg Gratings in Optical Fiber by a Transverse Holographic Method," published in Optics Lett., 14, p. 823, 1989, and herein incorporated by reference. The popularity of the FBG sensors have improved over the past few years because of their intrinsic nature and wavelength-encoded operation. A security system that employs a Bragg grating is disclosed in U.S. Pat. No. 5,351,324, issued Sep. 27, 1994, and herein incorporated by reference.

The FBG sensors are particularly attractive for quasi-distributed sensing because many Bragg gratings can be induced or written into the length of fiber, and interrogated by using wavelength-division multiplexing or time-division multiplexing, in a manner more fully described in a technical article of W. W. Morey, entitled "Distributed Fiber Grating Sensors," published in Proc. OFS, 90, p. 285, Sydney, Australia, Dec. 1990, and herein incorporated by reference. The FBG sensors may very well have application in the areas of advance composite material analysis, or "smart structures" analysis by allowing the FBG sensors to be embedded into materials so as to provide for real-time evaluation of load induced strain therein. The existing use of the FBG sensors for sensing applications of selected equipment, such as machinery, may be further described with reference to a prior art arrangement 10 of FIG. 1.

The arrangement 10 utilizes a Bragg grating sensor 12 comprised of a plurality of reflective Bragg gratings 12A, 12B, 12C ... 12N, each acting as a sensing element of sensor 10 and each of which may be interrogated by a wavelength-division multiplexing technique, described in the technical article of W. W. Morey, J. R. Dunphy and G. Meltz, entitled "Multiplexed Fiber Bragg Grating Sensors," published in the proceeding entitled 'Distributed and Multiplexed Optic Sensors,' published in SPIE vol. 1586, paper #22, Boston, Sept. 1991, and herein incorporated by reference. The sensor 12 may be referred to herein as being a fiber Bragg grating (FBG) sensor. The plurality of reflective Bragg gratings 12A, 12B, 12C ... 12N is induced or written into the sensor 12 in a manner known in the art, and each grating 12A, 12B, 12C ... 12N, serving as a sensing element, has a unique location along the piece of equipment that the arrangement 10 monitors, and a unique wavelength component for reflecting incident light, in a manner as more fully described in the previously incorporated by reference U.S. Pat. No. 5,351,324. Several FBG sensors 12 may be located on the equipment being monitored, or may be placed into a star type of an arrangement (not shown).

The circuit arrangement 10 of FIG. 1 utilizes a broadband source 14 which serves as a light source for providing input light represented by directional arrow 16, and defined by an input spectrum 18 generally illustrated as having a Y axis indicated as I (current), and a X axis indicated as λ which represents the wavelength of the input light 16. The input light 16 is applied to a coupler 20 and travels as incident light that intercepts each of the sensing elements 12A, 12B, 12C ... 12N which, in turn, reflects the incident light and which is shown by directional arrows 22, 24, 26 ... 28 respectively. The reflected light 22, 24, 26 ... 28 are shown in FIG. 1 as having respective spectrums 22A, 24A, 26A ... 28A which, in turn, respectively illustrate waveforms having center wavelength components $\lambda_1, \lambda_2, \lambda_3 ... \lambda_4$ that respectively correspond to the wavelength of the light reflected by the reflective Bragg gratings 12A, 12B, 12C ... 12N.

The broadband source 14 may be of the type selected from the group comprising an edge-emitting LED (ELED), a superluminescent diode, a superluminescent fiber source, and a fiber Erbium source all known in the art. The broadband source 14 has a typical predetermined operating wavelength of about 1.3 micrometers (μm) and has a typical bandwidth of about 50 nanometers (nm). For such a broadband source 14, the plurality of Bragg gratings 12A, 12B, 12C ... 12N are physically spaced from each other by a predetermined distance X (not shown) along the sensor 12, and each has a unique wavelength component that is separated from each other from about a fraction of a nanometer to even greater than a nanometer. The incident light that is reflected from the Bragg gratings 12A, 12B, 12C ... 12N contains the respective unique wavelength component of the respective Bragg grating. The distance X is dependent upon the number of sensor elements (12A, 12B, 12C ... 12N) to be used and the total distance on the equipment or material being monitored that the sensor 12 is to cover. For the selections of a broadband source 14 having a 1.3 μm operating wavelength and a bandwidth of 50 nm, and the sensor 12 having Bragg gratings separated from each other by a wavelength component of 1 nm, fifty (50) reflective Bragg gratings may be supported by the arrangement of FIG. 1 which is determined by the bandwidth (50 nm) being divided by wavelength separation (1 nm).

Each of the Bragg gratings of the plurality 12A, 12B, 12C ... 12N is subjected to incident light 16 and return a narrowbeam wavelength component all of which fall within the bandwidth of the broadband source 14. More particularly as seen in FIG. 1, incident light 16 causes the Bragg gratings 12A, 12B, 12C ... 12N to return reflected light 22, 24, 26, ... 28 respectively having response characteristics 22A, 24A, 26A ... 28A. As seen in FIG. 1, the response characteristics 22A, 24A, 26A ... 28A respectively illustrate the location of the wavelengths $\lambda_1, \lambda_2, \lambda_3, ... \lambda_N$ all of which are less than the λ which is representative of the operating wavelength of the broadband source 14. In operation, and as to be more fully described, measurand induced (e.g., acoustically induced) perturbations of a particular individual grating, such as that of Bragg gratings 12A, 12B, 12C ... 12N in the sensor 12, changes or alters the wavelength of light returned by that specific element. More particularly, for example, if the Bragg grating of element 12A, acting as a sensing element of the sensor 12, is subjected to a perturbation in the form of an acoustic force, then the unique wavelength $\lambda_1$ component of element 12A for reflecting incident light 16 is altered, relative to the unique wavelength $\lambda_1$, and the reflected light 22 possesses an altered wavelength component representative and proportional to the perturbation sensed by the sensing element 12A. The altered wavelength component may be detected at the output of the coupler 20 on signal path 30 by monitoring the wavelength shift sensed by wavelength shift decoder 32 associated with the respective Bragg gratings: 12A, 12B, 12C ... 12N. This wavelength shift is representative of the magnitude of the perturbation to which sensor 12 is being subjected.

The prior art technique illustrated in FIG. 1 for detecting the wavelength shift at each Bragg grating 12A, 12B, 12C ... 12N is based on a channel-by-channel determination of the wavelength of the Bragg grating return signals 22, 24, 26 ... 28 and may be further described with reference to FIG. 2.

As seen in FIG. 2, the wavelength shift decoder 32 comprises a wavelength-division multiplexer (WDM) splitter (demux) 32A that receives, via signal path 30, signals containing wavelength components $\lambda_1$-$\lambda_N$ respectively associated with Bragg gratings 12A ... 12N. The wavelength-division multiplexer 32A separates such components $\lambda_1$-$\lambda_N$ into the individual wavelength components $\lambda_1, \lambda_2, \lambda_3 ... \lambda_N$ respectively present on terminals 36A, 36B, 36C ... 36N which, in turn, are respectively routed to optical filters 38A, 38B, 38C ... 38N. The optical filters 38A, 38B, 38C ... 36N are preferably edge-type filters having a profile 40 generally illustrated in FIG. 2 as having a characteristic response 42 with a cut-off frequency at $\lambda_j$ at its knee and corresponding to the element j contained within the band defined by $\lambda_1$-$\lambda_N$. The element j has a pulse waveform 44 defined by a Y axis indicating the amplitude T, and a X axis indicating the wavelength $\lambda$ having a maximum value defined by the operating wavelength $\lambda$ of the broadband source 14. The optical filters 38A, 38B, 38C ... 38N require a series of filter characteristics so as to match the range of the Bragg wavelengths of the sensing elements 12A, 12B, 12C ... 12N, and which matching is a relatively difficult and expensive implementation. Furthermore, to compensate for possible fluctuations in the optical power levels at the output of the broadband source 14 of FIG. 1 due to extraneous factors, e.g., bending loss (bending of the sensor), source fluctuations (power changes) all known in the art, the implementation of FIG. 3 is desired to be employed.

FIG. 3 illustrates a ratiometric approach more fully described in the technical article of S. M. Melle, K. Liu and R. M. Measures, published in *Photonics Technol. Lett.*, 4, p. 516-518, 1992, and herein incorporated by reference. FIG. 3 illustrates the wavelength-division multiplexer (WDM) splitter 32A of FIG. 2, but being devoid of the optical filters 38A ... 38N thereof. The wavelength-division multiplexer (WDM) splitter 32A of FIG. 3 has a plurality of outputs identified by $\lambda_1, \lambda_2, \lambda_3 ... \lambda_4$, and each of which have additional elements coupled thereto. For example, $\lambda_1$ has an optical coupler 46A, a terminal 36A identified as having the wavelength $\lambda_1$ flowing therefrom, a detector 48 connected to the output of optical coupler 46A, and a detector 50 receiving the output ($\lambda_1$) of terminal 36A. The detector 48 provides an output signal identified as $I_1^{ref}$, and the detector 50 provides an output signal identified as $I_1$, with the outputs of both detectors 48 and 50 being routed to the ratio operating arrangement 52. The ratio arrangement 52 operates, whereby an output signal is provided and defined by the quantity $I_1/(I_1^{ref})$. The output signal of the ratio arrangement 52 of FIG. 3 is free of the drawback described for FIG. 2, but does suffer disadvantages due to the additional elements. It is desired that means other than the circuit arrangements of FIGS. 2 and 3 be provided so that an optical sensor system may be implemented without suffering the drawbacks and disadvantages of those described for FIGS. 2 and 3.

OBJECTS OF THE INVENTION

Accordingly, it is a primary object of the present invention to provide an optical sensor system for monitoring a piece of equipment by utilizing sensors having fiber Bragg gratings (FBG) serving as sensing elements, but without the need of elaborate filtering mechanisms, nor without the use of relatively complicated ratiometric approaches, yet still providing numerous sensor elements, such as between 50–400 of such FBG sensors.

It is another object of the present invention to provide for an optical fiber sensing system employing fiber Bragg gratings that are used to measure time-varying measurand fields, such as acoustic pressure, vibration, and magnetic and electrical fields.

SUMMARY OF THE INVENTION

The present invention is directed to an optical system utilizing fiber Bragg gratings for monitoring and measuring the perturbations to which a piece of equipment is subjected.

The system comprises an optical sensor, a light source, an unbalanced interferometer, means for generating a modulation signal, a phase modulator and a demodulator. The sensor is placed along the piece of equipment and has a plurality of reflective Bragg gratings induced in the sensor and each grating acting as a sensor element. Each grating has a unique location along the piece of equipment and a unique wavelength component for reflecting incident light. Each of the unique wavelength components of the sensor are altered when subjected to perturbations. The light source provides input lights to the sensor at all of the wavelength components of the Bragg grating so as to reflect incident light from each of the gratings. The unbalanced interferometer receives the reflected incident light from each of the gratings. The unbalanced interferometer has first and second arms and generates interferometric signals for each wavelength component of the incident light reflected by each of the Bragg gratings. The phase modulator receives the modulation signal and is placed into one of the arms of the unbalanced interferometer. The phase modulator modulates each of the interferometric signals. The demodulator receives each of the modulated interferometric signals and produces output signals representative of the amount each of the unique wavelength components of the reflected incident light is altered when subjected to the perturbations.

BRIEF DESCRIPTION OF THE DRAWINGS

These and other objects, features and advantages of the invention, as well as the invention itself, will become better understood by reference to the following detailed description when considered in connection with the accompanying drawings wherein like reference numbers designate identical or corresponding parts throughout the several views and wherein.

DETAILED DESCRIPTION OF THE EMBODIMENTS OF THE INVENTION

Before the drawings are discussed, it should be noted that the optical sensor system of the present invention detects perturbations indicative of the performance of the equipment being monitored. The optical sensing system comprises one or more fiber optic fibers having Bragg gratings embedded therein which are arranged into a preselected distribution, wherein each Bragg grating serves as a sensing element and when excited by incident light, returns a narrowband signal identified by a predetermined wavelength. The perturbations occurring in the system being monitored are detected by an unbalanced interferometer cooperating with other optically responsive elements being interrogated by multiplexing techniques that include differentiate-cross-multiply (sine/cosine functions) and time-division techniques.

Figure 1:
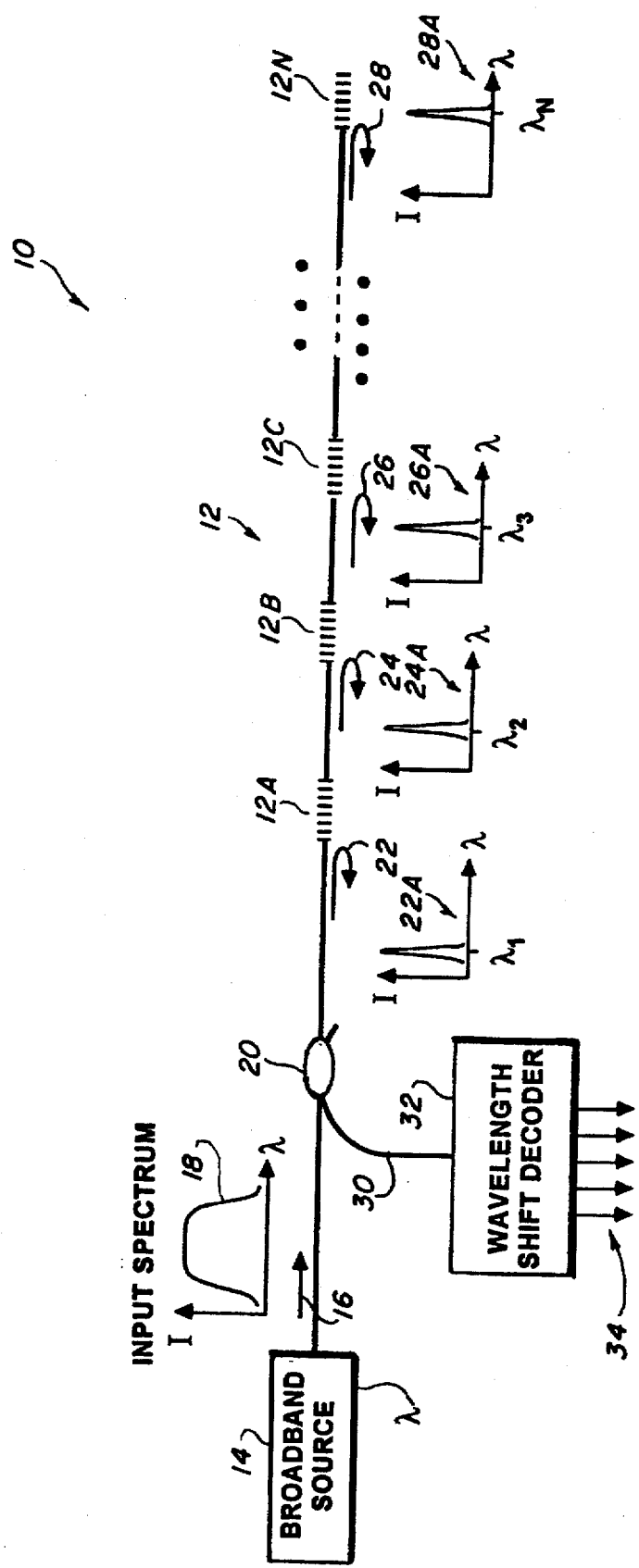
FIG. 1 is a schematic diagram of a prior art arrangement.
Figure 2:
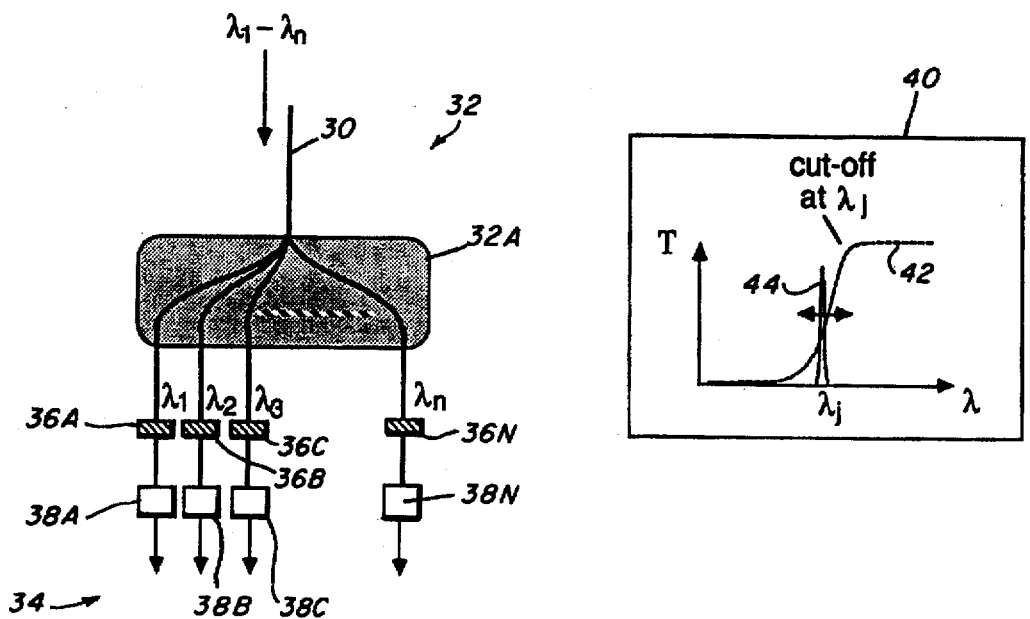
FIGS. 2 and 3 are schematic diagrams that cooperate with the prior art arrangement of FIG. 1 for the detection of perturbations related to equipment being monitored.
Figure 3:
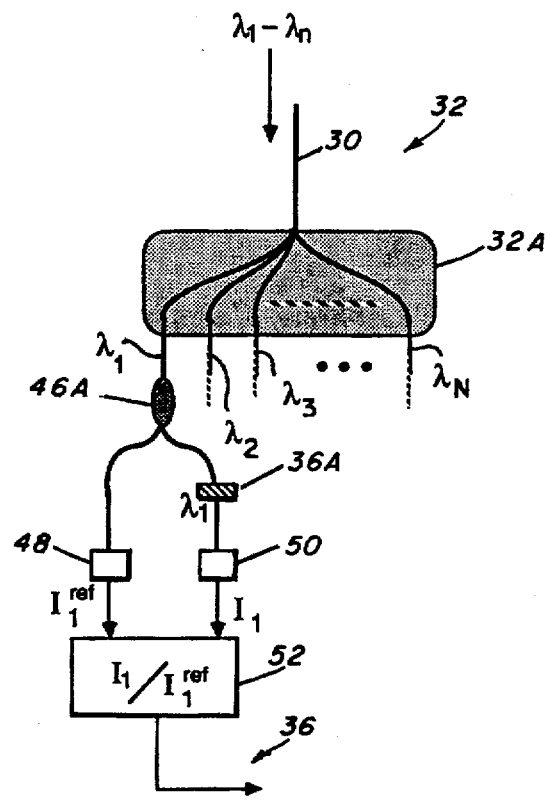
Figure 4:
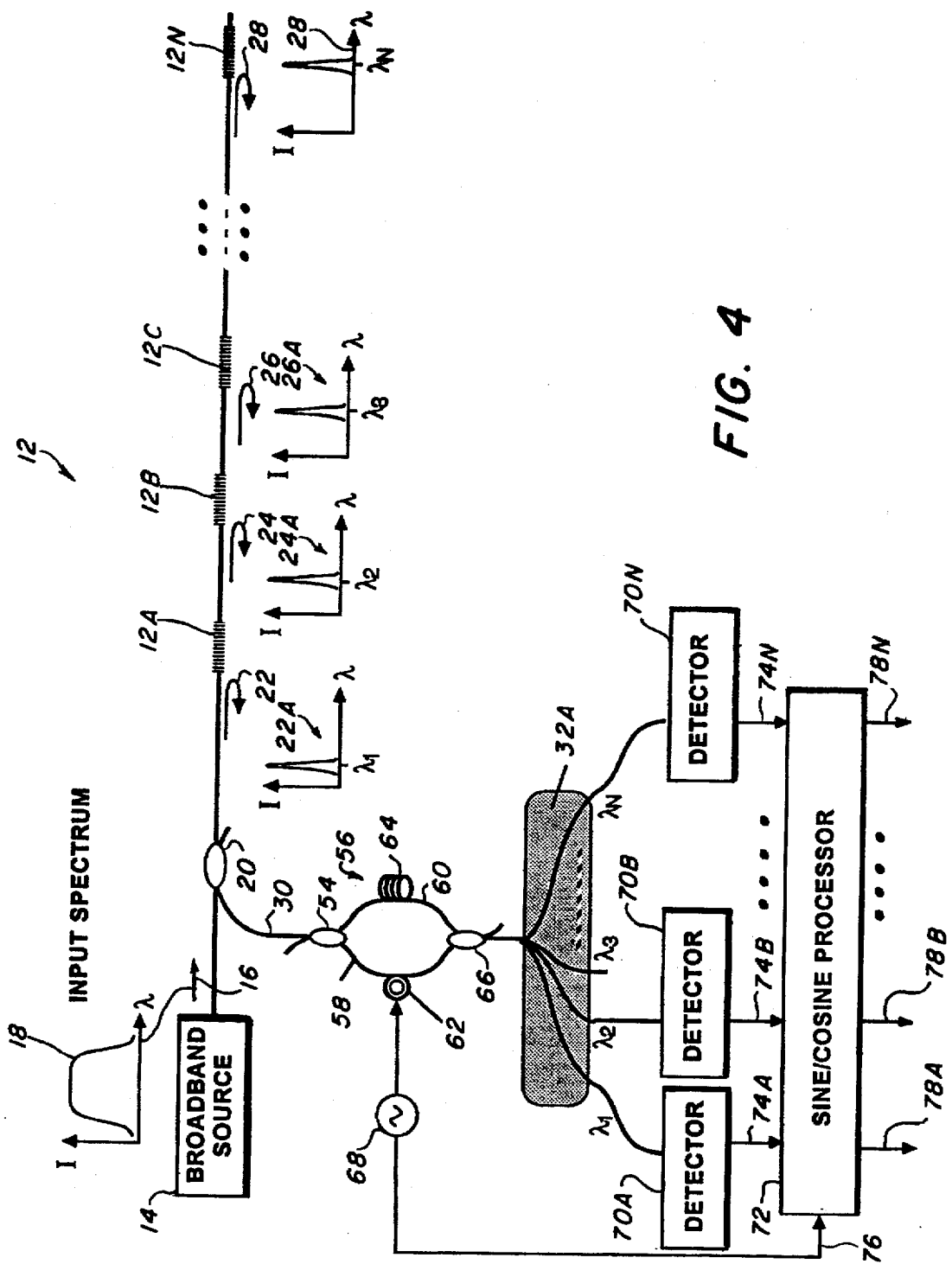
FIG. 4 is a schematic diagram of a first embodiment of the present invention.

One embodiment of the present invention is illustrated in FIG. 4, which includes the elements previously described for the prior art arrangement 10 of FIGS. 1, 2 and 3, but, in addition thereto, includes an optical coupler 54 which receives the reflected light 22, 24, 26 . . . 28 that respectively contains the unique wavelength components $\lambda_1, \lambda_2, \lambda_3 \ldots \lambda_N$ of the Bragg gratings 12A, 12B, 12C . . . 12N respectively. The optical coupler 54 is at the input stage of an unbalanced interferometer 56 having arms 58 and 60 one of which, for example, arm 58 includes a phase modulator 62 and the other of which includes a coil 64 which serves as a compensating or delay coil to ensure that the length of the optical path difference (to be described) between the two arms 58 and 60 is about one (1) centimeter. The unbalanced interferometer 56 has a coupler 66 at its output stage.

The unbalanced interferometer 56 may be a Mach Zehnder type and generates an interferometric signal for each of the wavelength components $\lambda_1, \ldots \lambda_N$ reflected by each of the Bragg gratings 12A, 12B, 12C . . . 12N respectively contained in the returned incident light 22, 24, 26 . . . 28. However, it should be realized that other interferometer configurations, such as a Michelson interferometer configuration, could be used in the place of the Mach Zehnder configuration. The unbalanced interferometer 56 has an optical path difference or OPD between the arms 58 and 60. The optical path difference (OPD) of the unbalanced interferometer 56 is equal to nd, where d is the length imbalance between the arms 58 and 60 and n is the effective propagation index of the core 64. The unbalanced interferometer 56 may be of the type more fully described in U.S. Pat. No. 5,227,857, issued Jul. 13, 1993, and herein incorporated by reference. Further, the operation of a device, such as the unbalanced interferometer 56, that generates an interferometric signal is more fully described in a technical article of A. D. Kersey, T. A. Berkoff and W. W. Morey, published in *Electronics Letters*, 28, p. 236–238, 1992, and herein incorporated by reference. The form of the generated interferometric signals may be given by the below expression (1):

$$I(\lambda_j) = A_j [1 + k \cos[\psi_j(\lambda_j) + \phi]] \qquad (1)$$

where $\psi_j(\lambda_j) = 2\pi nd/\lambda_j$; and $A_j$ is dependent on the input intensity and profile of the incident light 16, system losses and grating reflectivity at $\lambda_j$; $\lambda_j$ is the wavelength of the return light from the j-th grating sensor (sensor signal) contained with Bragg gratings 12A . . . 12N, and $\Phi$ is a random bias phase offset. All of the interferometric signals generated by the unbalanced interferometer 56 pass through the output coupler 66 and onto the wavelength-division multiplexer (WDM) splitter 32A previously discussed with reference to FIGS. 1, 2 and 3, and which is further described in the technical article of J. B. D. Soole et al., entitled "Spectrometer on a Chip: a Monolithic WDM Component," published in *Proc. OFC'92*, p. 123, (OSA), 1992, and herein incorporated by reference. It is desired that the wavelength-division demultiplexing performed by wavelength-division multiplexer 32A be matched in nominal wavelength response to the range of the center wavelengths of the Bragg gratings 12A, 12B, 12C . . . 12N ($\lambda_1, \lambda_2, \lambda_3 \ldots \lambda_N$) in the sensor 12 positioned on the equipment being monitored by the arrangement of FIG. 4.

The wavelength spacing between the Bragg gratings 12A, 12B, 12C . . . 12N depends upon the operational range required to account for possible residual quasi-static strain and temperature shifts at the points where the Bragg gratings 12A, 12B, 12C . . . 12N are located. The provisioning of allowing a sufficiently large wavelength range for the one or more sensors 12 of FIG. 4 is critical when static strain sensing is being accomplished by the sensing system of the present invention. The wavelength range must take into account the wavelength spacing between the unique wavelengths of each of the Bragg gratings 12A, 12B, 12C . . . 12N, each serving as a sensing element for the overall one or more sensors 12. Typically, the Bragg wavelength shifts by approximately 1 nm per 1,000 micro strain meters in an environment, where the broadband source 14 has an operating wavelength of 1.3 µm. For example, when the Bragg grating 12A having a unique wavelength component of $\lambda_1$ receives incident light, having a wavelength of 1.3 µm, is subjected to a strain of 1,000 microstrain and is correspondingly stretched, the Bragg grating 12A reflects the incident light having a wavelength that is altered 1 nm relatively to wavelength $\lambda_1$, and such a component of reflected light is present in the returned light signal 22.

In the application of the sensing system of the present invention for measuring acoustic emission vibration sensing, the sensor 12, in particular the Bragg grating 12A, 12B, 12C . . . 12N, can be designed to weakly couple static strains, and thus permit close spacing of the Bragg grating wavelengths at the Bragg grating elements 12A, 12B, 12C . . . 12N that is, spacing of less than 1 nm and, thus, increasing the number of Bragg gratings 12A, 12B, 12C . . . 12N to be greater than 50 (previously discussed). The other factor influencing the wavelength spacing between the Bragg gratings 12A, 12B, 12C . . . 12N is due to temperature. The Bragg wavelength of a typical fiber grating shifts with temperature at the rate of approximately one part in $10^5$ per ° C. For operation with a broadband source 14 having an operational wavelength of 1.3 µm, a 1.3 nm spacing between the Bragg gratings 12A, 12B, 12C . . . 12N thus allows a 100° C. temperature variation in the FBG sensor 12 to be tolerated. A large temperature difference could be tolerated by using wider wavelength spacing between the Bragg gratings. Due to wavelength sensitivity of a typical unbalanced interferometer, such as the unbalanced interferometer 56, the interference phase shift is different for each wavelength component at the outputs of the wavelength division multiplexer 32A.

In one embodiment for measuring acoustic emissions, without the benefits of the present invention, acoustically induced modulations in the Bragg wavelengths of the individual Bragg sensor elements 12A, 12B, 12C ... 12N cause a modulation in the phase shift of the interferometric output signals produced by the unbalanced interferometer 56 for each received and processed wavelength component. These phase modulation components may be given by the below expression (2):

$$\Delta \psi_j(t) = \frac{2\pi n d}{\lambda_j} \zeta \Delta \epsilon_j(t) \quad (2)$$

where $\Delta \epsilon_j$ is the acoustically-induced dynamic strain subjected to the j-th grating, and $\zeta$ is the normalized strain-to-wavelength shift responsivity of the associated Bragg grating.

In order to monitor and accommodate for the undesired phase shifts of the signals represented by expression (2), the signals produced by the interferometer 56 are "demodulated" by the use of a phase modulator 62, such as a piezoelectric fiber stretcher placed in one of the arms, such as arm 58, of the unbalanced interferometer 56. The phase modulator 62 receives a modulation signal generated by a modulation generator 68. The demodulation technique used in the interferometric sensing of the arrangement of FIG. 4 may be a differentiate-cross-multiplication (sine/cosine) approach described in the technical article of A. Dandridge, A. B. Tveten and T. G. Giallorenzi, entitled "Homodyne Demodulation Scheme for Fiber Optic Sensors Using Phase Generated Carrier," published in *IEEE J. Quantum Electron.*, QE-18, p. 1647, 1982, and herein incorporated by reference; a synthetic heterodyne detection technique described in the technical article of D. A. Jackson, A. D. Kersey and M. Corke, entitled "Pseudo-Heterodyne Detection Scheme for Optical Interferometers," published in *Electron. Lett.*, 18, p. 1081, 1982, and herein incorporated by reference; or a phase tracking circuit known in the art.

FIG. 4 illustrates a differentiate-cross multiply (DCM) demodulator comprised of the wavelength-division multiplexer (WDM) 32A, detectors 70A, 70B ... 70N each of which delivers its output signals, comprising sine and cosine components, to the sine-cosine processor 72 via signal paths 74A, 74B ... 74N respectively. The sine-cosine processor 72 receives, via signal path 76, the modulation signal developed by the modulator generator 68. The detectors 70A, 70B ... 70N may be of the type described in U.S. Pat. No. 5,227,857, whereas the sine-cosine processor 72 may be of the type described in U.S. Pat. No. 5,227,857 for signal processor 55.

The interferometric demodulator of FIG. 4, comprised of the unbalanced interferometer 56, the wavelength-division multiplexer 32A, the detectors 70A ... 70N and the processor 72, has a typical phase resolution in the range of approximately 1 to 10 $\mu rad/\sqrt{Hz}$ in the acoustic range, and small .variations in the Bragg wavelength can be detected. It is contemplated that the practice of the present invention can detect acoustically-induced shifts in the Bragg wavelength of the sensor elements 12A, 12B, 12C ... 12N of as little as 1 part in $10^{10}$. The sensor 12 illustrated in FIG. 4 may have a variety of embodiments such as those shown in FIGS. 5-8.

Figure 5:
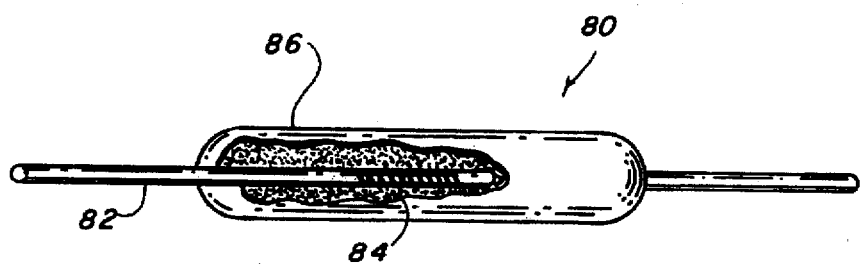
FIGS. 5, 6 and 7 (composed of FIGS. 7(A) and 7(B)) illustrate various embodiments of sensors of the present invention related to the detection of acoustic emissions.

FIG. 5 is partially cut-away to illustrate a fiber Bragg grating (FBG) acoustic sensor 80 comprised of an optical fiber 82 that conducts light and has a preselected Bragg grating 84 induced, written or embedded therein. The Bragg grating 84 corresponds to the Bragg gratings 12A, 12B, 12C ... 12N, each serving as a sensing element, shown in FIGS. 1 and 4, as well as FIGS. 9–11 to be described.

The FBG sensor 80 is directly responsive to an acoustic field and is typically placed directly in the acoustic medium, such as air or liquid, and its sensitivity is determined directly by the strain-optical coefficient of the fiber. The strain-optical coefficients of optical fibers are well known and are described in Chapter 10 in the text entitled "Fiber Optic Sensors," E. UDD Editor, Wiley, 1992, and herein incorporated by reference. The FBG acoustic sensor 80 is preferably coated with the elastomeric material or fiber coating 86 which enhances the acoustical sensitivity of the sensor 80 because the elastomeric material 86 typically has a high Young's modulus, but low bulk modulus (high compressibility) and is more fully described in the description "Fiber Optic Sensors." The elastomeric material causes enhancement of the free field responsivity of the FBG sensor 80 to be greater than 30 db and the sensitivities of the FBG sensor 80 to be in a range of about 100 db re 1 $\mu PA/\sqrt{Hz}$. The FBG sensor 80 is particularly suitable for being placed within a piece of equipment filled with oil, for example, such as that found in electrical power distribution equipment. The direct coupling provided by the FBG sensor 80 of the acoustical signals through the medium of the fiber coating 86 provides a point-by-point map of the acoustic emissions within the equipment being monitored. A further sensor responsive to acoustic emissions or vibrations may be described with reference to FIG. 6.

Figure 6:
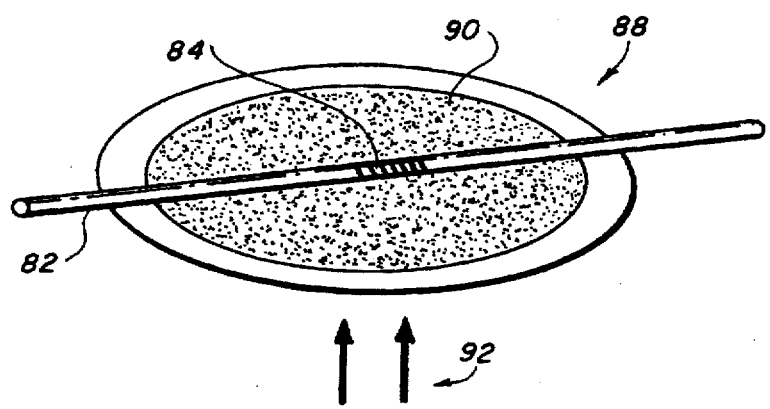

FIG. 6 illustrates a diaphragm sensor 88 comprising the optical fiber 82 having the Bragg grating 84 induced therein, and affixed to a flexible diaphragm 90 by appropriate means (not shown), such as an adhesive. The diaphragm sensor 88 responsivity is determined by the deflection response of the diaphragm element 90, and not by the fiber coating properties, such as the elastomeric material 86 of FIG. 5. The diaphragm sensor 88 has an enhanced sensitivity, relative to the FBG sensor 88 of FIG. 5, but it is desired that the diaphragm sensor 88 be pressure compensated to avoid large quasi-static pressure induced shifts in the wavelength component of the Bragg grating 84. It is anticipated that the diaphragm sensor may have sensitivities approaching 80 db re 1 $\mu Pa/\sqrt{Hz}$. A further embodiment of a sensor responsive to acoustic emissions may be further described with reference to FIG. 7.

Figure 7A:
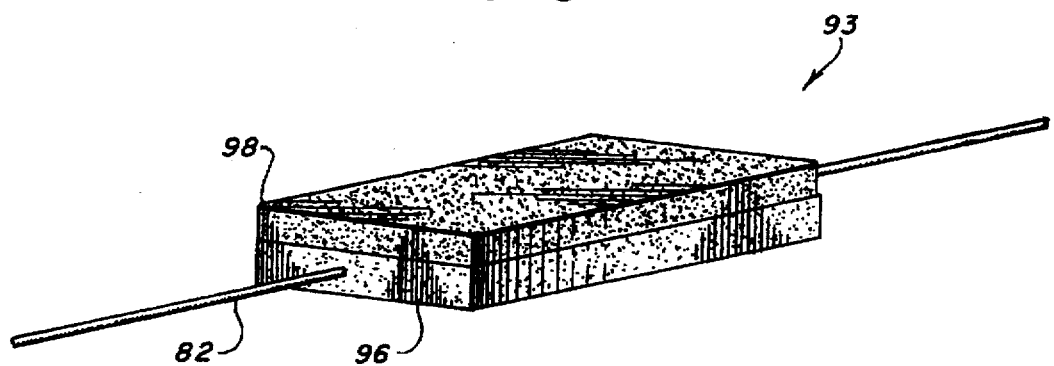
Figure 7B:
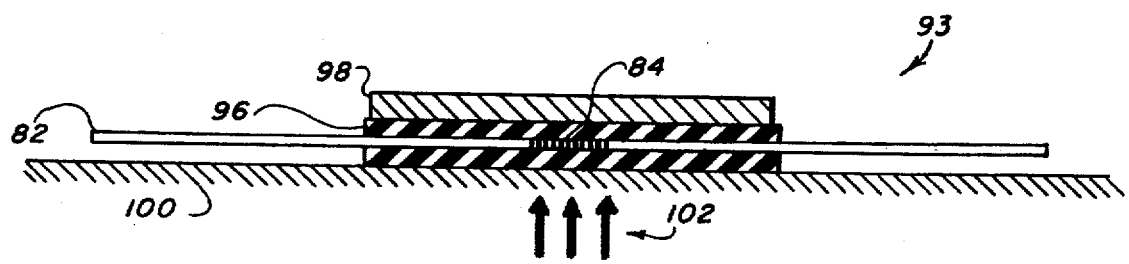

FIG. 7 is composed of FIGS. 7(A) and 7(B) which cumulatively illustrate an accelerometer type sensor 93. FIG. 7A illustrates the accelerometer sensor 93 as being comprised of the optical fiber 82 that is embedded in a layer of compliant material 96 which is loaded with a rigid backing layer 98 serving as a mass M. The material 96 may be any form of soft compliant material such as plastic or rubber, whereas the layer 98 may be any stiff material such as metal, glass or ceramic.

As seen in FIG. 7(B), the optical fiber 82 has the Bragg grating 84 induced therein, wherein the compliant material 96 rests upon a structure 100 that is subjected to perturbations 102 typically created by acoustic emissions. The perturbations 102 may be out-of-plane vibrations associated with the structure 100. The accelerometer sensor 93 may be rested on the structure 100 which may be a gear-box casing, and the frequency response and responsivity of the accelerometer sensor 93 depend upon the stiffness of the compliant material 98 and the mass (M). If desired, the fiber 82, carrying with it the induced Bragg grating 84, may be embedded directly within a material especially when the material is plastic, glass-fiber, or a composite material used for the structural components under evaluation. Sensors responsive to time varying vibrations, electric and/or magnetic field disturbances may be further described with reference to FIG. 8.

Figure 8A:
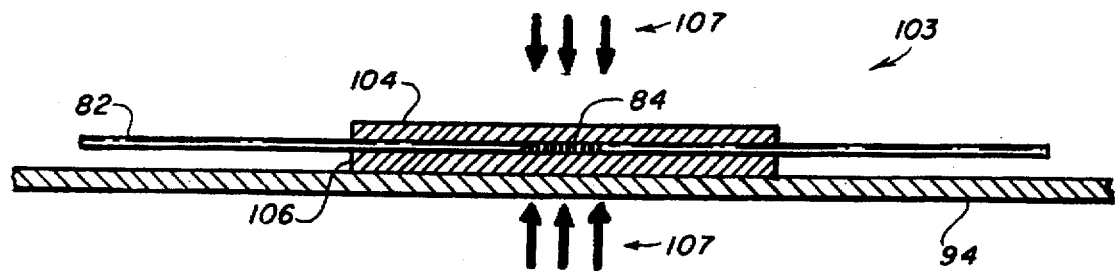
FIG. 8 is composed of FIGS. 8(A), 8(B), 8(C) and 8(D), which disclose sensors for measuring perturbations using magnetic or electric field detection techniques.
Figure 8B:
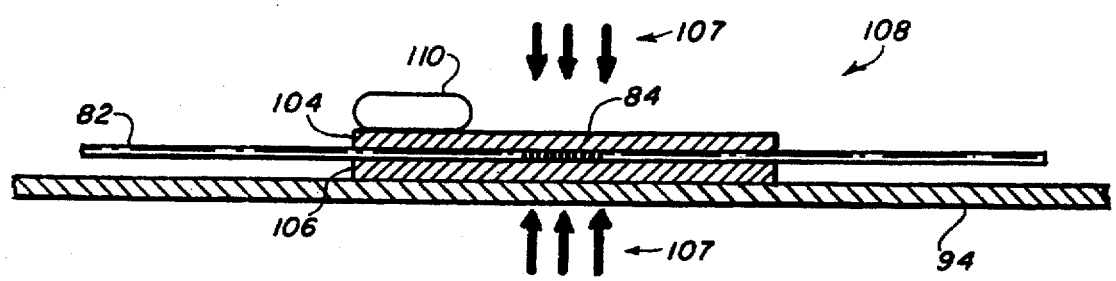
Figure 8C:
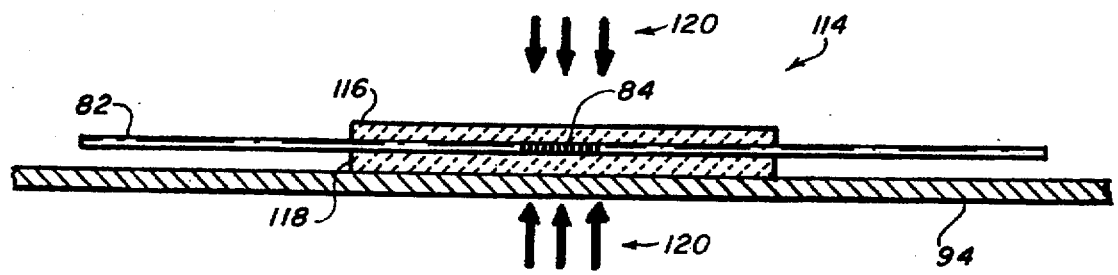
Figure 8D:
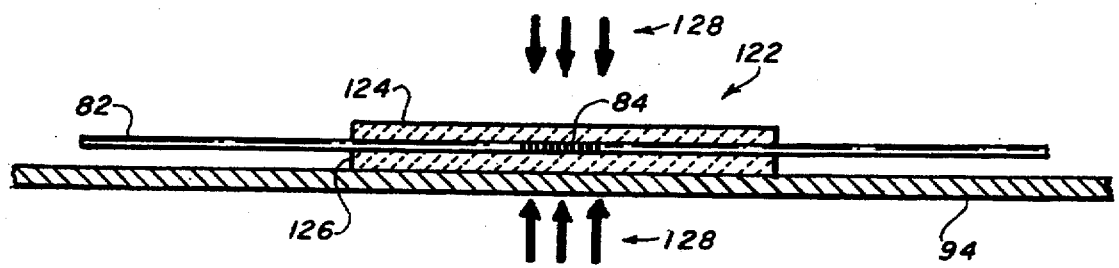

FIG. 8 is composed of FIGS. 8(A), 8(B), 8(C), and 8(D) each of which illustrated sensor may be used to respond to perturbations, other than perturbations caused by acoustical emissions. All of the sensors of FIG. 8 can be utilized for monitoring equipment by means of the detection of physical fields, such as magnetic and electrical fields. The sensor of FIGS. 8(A), 8(B), respond to a magnetostrictive effect, whereas the sensors of FIGS. 8(C) and 8(D) are respectively responsive to electrostrictive or piezoelectric effects.

FIG. 8(A) illustrates a sensor 103 that is responsive to magnetostrictive effects and comprises the optical fiber 82 having the Bragg grating 84 induced therein. The optical fiber 82 is placed between two elements 104 and 106 effectively forming a composite bar. The plates 104 and 106 are comprised of a magnetic material, such as Imbar, Monel metal, Nichrome, Nickel, metallic glass or Stoic metals, all known in the art which expand or contract in proportion to the strength of an applied magnetic field 107 which, in turn, is proportionate to the perturbations that the material 94 is subjected to. The magnetostrictive effect to which the sensor 103 responds is non-linear, but such non-linearity may be compensated for by the embodiment shown in FIG. 8(B).

FIG. 8(B) illustrates a sensor 108 responsive to the magnetostrictive effects in a manner similar to that described for sensor 103. The sensor 108 has a local permanent magnet 110 positioned near the Bragg grating 84 and which provides a biasing field. The local magnet 110 compensates for the non-linearity of the magnetostrictive effect experienced by the sensor 108. More particularly, the local permanent magnet 110 interacts with the time varying changes, such as those created by alternating current (AC), in such a manner as to lead to a concomitant variation in the strain at the Bragg grating 84 and, thus, a concomitant variation to the Bragg grating wavelength of the grating 84. It is anticipated that sensitivities in the range of 1 milli-Gauss/√Hz are possible and which make sensor 108 particularly suitable for applications of vehicle detection/counting, traffic pattern monitoring all of which have been recently made popular on so-called smart highway systems. A further embodiment of a sensor used in the practice of the present invention may be further described with reference to FIG. 8(C).

FIG. 8(C) illustrates a sensor 114 having the optical fiber 82 with a Bragg grating 84 induced therein. The optical fiber 82 is placed between layers 116 and 118 of a material such as barium titanate so as to form a ceramic plate which when subjected to a voltage, indicated by directional arrow 120, applied across its parallel faces, causes contraction thereof. The voltage is proportionate to the perturbations that the material 94 is subjected to which, in turn, is representative of the amount of physical variations thereof. A further embodiment for the sensor related to the practice of the present invention may be further described with reference to FIG. 8(D).

FIG. 8(D) illustrates a sensor 122 that possesses piezoelectricity characteristics. The sensor 122 has the optical fiber 82, with the Bragg grating 84 induced therein, placed between the piezoelectric material 124 and 126, such as a known piezoelectric ceramic, and which delivers a voltage when deformed, or conversely, which changes its shape when a voltage is applied to it with the voltage being represented in FIG. 8(D) by directional arrows 128. All of the embodiments of all of the sensors of FIG. 8, as well as the sensors of FIGS. 5–7, may be used in the previously discussed arrangements of FIG. 4, as well as the arrangement of FIG. 9.

Figure 9:
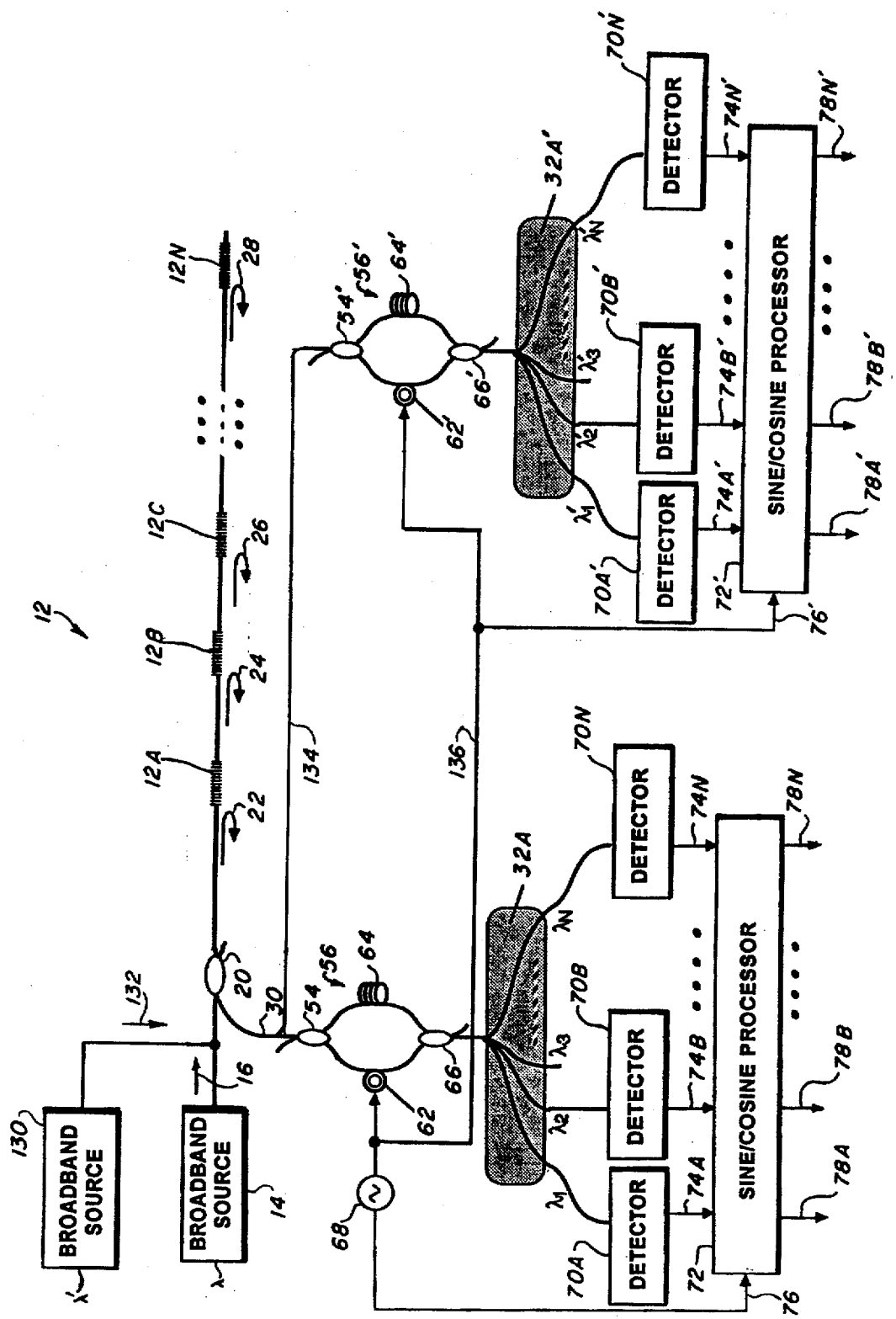
FIG. 9 illustrates a further embodiment of the present invention similar to the embodiment of FIG. 4.

FIG. 9 is similar to FIG. 4, both of which use the wavelength-division multiplexing techniques, as well as the broadband source 14 having an operating wavelength λ, but FIG. 9 also uses an additional broadband source 130 having an operating wavelength of λ' having a typical value of 1.55 μm and which acts as a second light source for providing input light, indicated by directional arrow 132, to the sensor 12. The broadband source 130 may be of the same type as broadband source 14. The second broadband source 130, in a manner as described for the broadband source 14 with reference to FIG. 4, has a bandwidth, such as 50 nm, that covers all of the wavelengths for reflecting light from the Bragg gratings 12A, 12B, 12C . . . 12N.

The arrangement of FIG. 9 further includes a second unbalanced interferometer 56', and a demodulator comprised of the wavelength-division multiplexer (WDM) 32A' and the detectors 70A', 70B'0 . . . 70N', as well as the sine/cosine processor 72'. All of the elements of FIG. 9 identified by the prime (') nomenclature operate in the same manner as those described with reference to FIG. 4 for the elements that are lacking the prime (') identification. The second unbalanced interferometer 56' is connected to signal path 30, via signal path 134. The second unbalanced interferometer 56' has its phase modulator 62' connected to the modulation signal generator 68 by way of signal path 136. Similarly, the sine/cosine processor 72' is connected to the modulation signal generator 68, via signal path 76'.

In operation, the arrangement of FIG. 9 selects an operating wavelength λ of 1.3 μm for the broadband source 14 and correspondingly selects the broadband source 130 as having an operating wavelength λ' of 1.55 μm. Similarly, the first unbalanced interferometer 56 and the wavelength-division multiplexer 32A are selected to have an operating frequency to correspond to the broadband source 14 of 1.3 μm for the wavelength λ and similarly, the second unbalanced interferometer 56' and the second wavelength-division multiplexer 32A' are selected to have an operating wavelength of 1.55 μm to correspond to the wavelength λ' of the broadband source 130. Further, the plurality of selected Bragg gratings 12A, 12B, 12C . . . 12N are spaced apart from each other by a typical distance of X, previously described with reference to FIG. 4, and are selected to have a wavelength component spacing of 1 nm so that the arrangement of FIG. 9 can accommodate up to 200 Bragg grating sensing elements 12A, 12B, 12C . . . 12N. Upon such selection of operating wavelengths and the number of Bragg gratings, the circuit arrangement of FIG. 9 operates in a similar manner as that of FIG. 4 so that the sine/cosine processor 72 provides for output signals on signal paths 78A . . . 78N representative of the amount each of the wavelength components, respectively contained in reflected incident light signals 22 . . . 28 having the 1.3 μm carrier frequency of the broadband source 14, are altered relative to the wavelengths $\lambda_1 \ldots \lambda_N$ of the Bragg gratings 12A . . . 12N, when subjected to perturbations. Similarly, the sine/cosine processor 72' produces output signals on signal paths 78A' . . . 78N' representative of the amount each of the wavelength components respectively contained in reflected incident light signals 22 . . . 28 having the 1.55 μm carrier frequency of the broadband source 130 are altered relative to the wavelength $\lambda_1' \ldots \lambda_N'$ of the Bragg gratings 12A . . . 12N, when subjected to perturbations. Although both the circuit arrangements of FIGS. 4 and 9 accommodate a large number of sensors, the capability of allowing additional sensors may be provided by time-division multiplexing techniques which may be further described with reference to FIG. 10.

Figure 10:
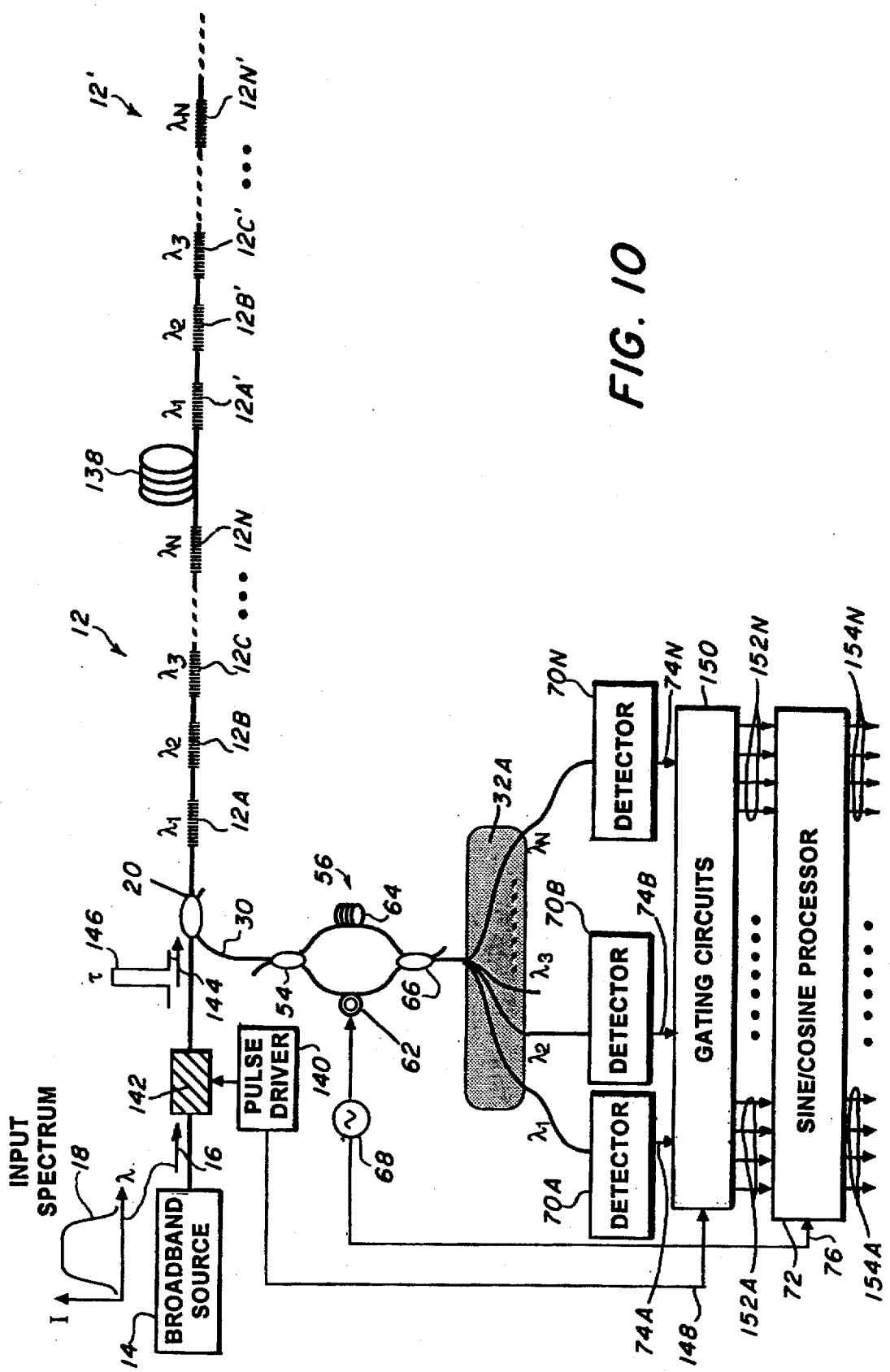
FIG. 10 illustrates another embodiment of the present invention.

The arrangement of FIG. 10 includes a first and a second plurality of reflective Bragg grating elements indicated and being grouped by the reference numbers 12 and 12', and which are separated from each other by a fiber delay device 138 so as to be formed into two arrays, each of which array has the same Bragg grating with a unique wavelength component matching and being relative to each other. For example, the first array (12A, 12B, 12C . . . 12N) included in the sensor 12 has a Bragg grating 12A with a unique wavelength component $\lambda_1$ for reflecting incident light that corresponds to and matches the unique wavelength component $\lambda_1$ for reflecting incident light of Bragg grating 12A' of sensor 12'. If more than two sensors 12 and 12' are used, then an additional fiber delay device 138 is interposed between each FBG sensor having the array of Bragg gratings therein. Further, the Bragg gratings 12A, 12B, 12C . . . 12N and 12A', 12B', 12C' . . . 12N' are separated from each other by a predetermined distance of X, previously described with reference to FIG. 4 and are preferably spaced apart from each other, wavelength wise, by a 1 nm amount.

The arrangement of FIG. 10 further includes a pulse driver 140 that produces a pulse applied to the coupler 20, via gating device 142, and is shown as a directional arrow to represent an incident light ray or pulse 144 having a pulse characteristic 146 with a predetermined pulse duration $\tau$. The gating device 142 only allows for the passage of the output of the broadband source 14 onto the optical coupler 20 during the presence of the pulse 144. The pulse 144 is also applied, via signal path 148, to the gating circuits 150. Further still, the circuit arrangement of FIG. 10 includes gating circuits 150 that receives the sine and cosine signals from the detectors 70A, 70B . . . 70N and that is responsive to the pulse 144 and that provides the sine and cosine signals as outputs thereof indicated by the plurality of grouped signal paths 152A . . . 152N.

The Bragg gratings 12A . . . 12N and 12A' . . . 12N' are induced or written into their respective FBG sensors 12 and 12' with a nominal reflection coefficient of a few percent, such as 2%. This arrangement allows for a small portion of the incident light 16 to be reflected from each Bragg grating, whereas the remaining, stronger signal making up incident light 16 is passed onto the additional Bragg grating series, that is, those of the Bragg gratings 12A . . . 12N'. With wavelength reflection coefficients of the Bragg gratings 12A . . . 12N' of a few percent, several (e.g., 5 to 8) series of Bragg gratings 12, 12' may be interrogated. For the interrogation of >10 Bragg grating series (12 . . . 12'), the reflection coefficients of <2% insures for low crosstalk between sensors, such as between sensors 12 and 12'.

In operation, and with reference to FIG. 10, the output of the broadband source 14 is pulsed with the pulse 144 having the duration of $\tau$. The pulse 144 also causes return signals from the sensors 12 and 12' to be generated at each of the outputs of the wavelength-division multiplexer 32A. Each of these outputs comprises a series of pulses originated from the corresponding Bragg grating in each grating series (12 and 12') in the array. These series of pulses are present at the outputs of the detectors 70A, 70B . . . 70N and representative of the wavelength components $\lambda_1, \lambda_2 \ldots \lambda_N$ corresponding to the Bragg gratings 12A . . . 12N'. If the width of the pulse 144 is selected to be less than the optical round-trip propagation delay between matching grating sensor elements (12 and 12') in adjacent Bragg grating series, the pulses produced at the outputs of the detector 70A, 70B . . . 70N are time separated and are routed to gating circuits 150 that are responsive to the pulse 144. For example, if Bragg gratings 12A and 12A' are selected to have a unique wavelength component $\lambda_1$ for reflecting incident light (pulse 144), then the pulses present at the output ($\lambda_1$) of the wavelength-division multiplexer 32A are representative of $\lambda_1$ and are separated in time. These time-division multiplexed pulses present at the outputs of the detectors 70A . . . 70N are applied to gating circuits 150, via signal paths 74A . . . 74N respectively. The outputs of the gating circuits 150 are routed to the sine/cosine processor 72 which performs time-division multiplexing allowing a several fold enhancement in the number of sensors which can be supported by the arrangement of FIG. 10, relative to that of either FIGS. 9 and 4. For example, a comparison between FIG. 4 and FIG. 10 reveals that for the use of a broadband source 14, having an operating wavelength $\lambda$ of 1.3 μm with a 50 nm bandwidth, yields a four fold time-division multiplexed (TDM) enhancement so that a total of 200 sensor elements may be used as compared to the limitation of only 50 sensor elements of FIG. 4. The four fold enhancement takes into account the need to monitor the active and idle (2) states of the multiplexed signal. The number of sensor elements may be doubled by the circuit arrangement of FIG. 11.

Figure 11:
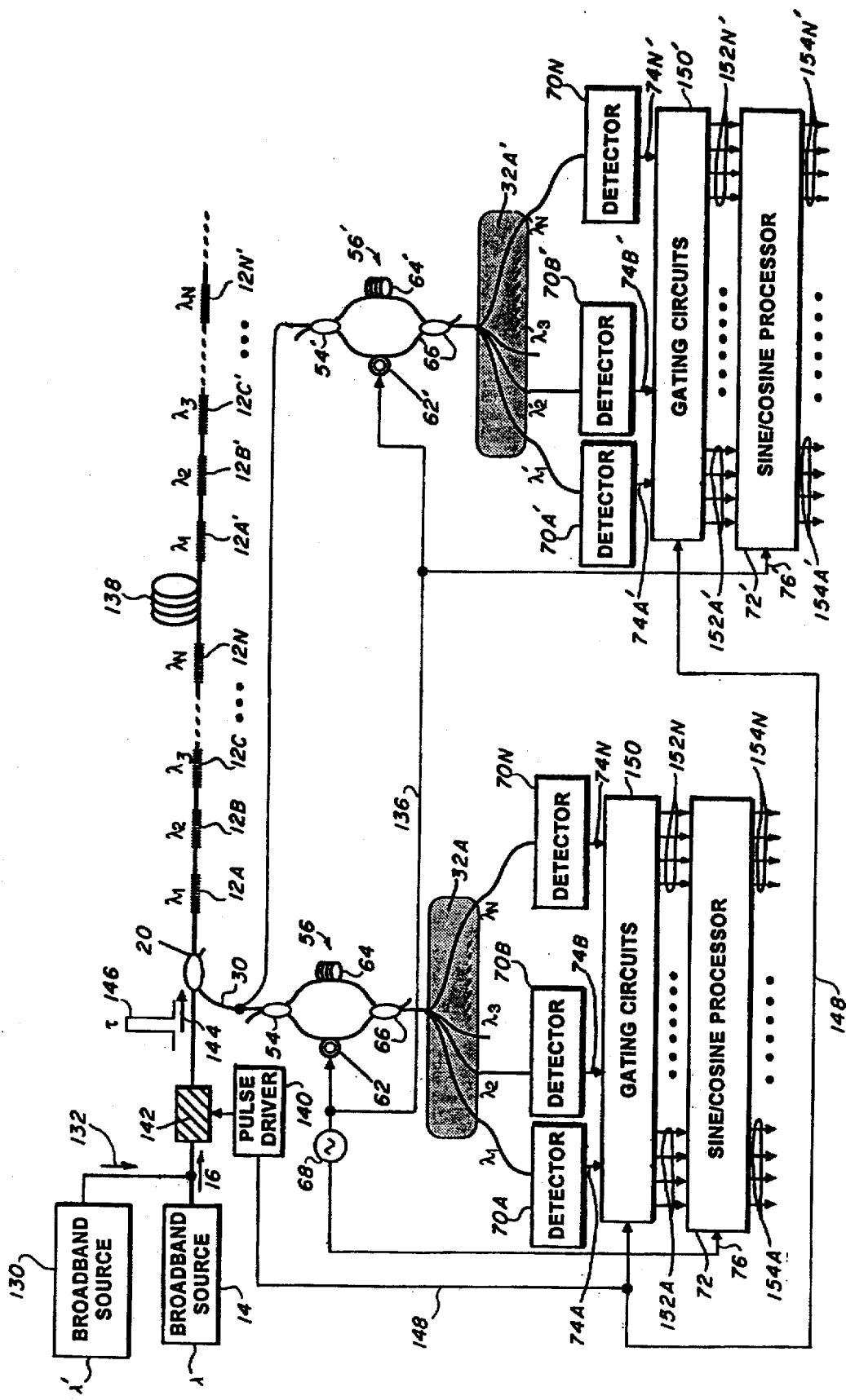
FIG. 11 is a schematic diagram of a still further embodiment of the present invention similar to the embodiment of FIG. 10.

The circuit arrangement of FIG. 11 is similar to that of FIG. 10, with the addition of elements indicated by the use of the prime (') nomenclature and which prime (') indicated elements that are operated in the same manner as those not identified by the prime (') nomenclature already described with reference to FIGS. 1, 4, 9 and 10. Further, the prime (') elements are selected to have an operating wavelength to correspond to the broadband source 130 operating wavelength $\lambda$' in a manner as previously described with reference to FIG. 9. Once the operating wavelengths are selected for the first and second interferometers 56 and 56' respectively and for the first and second wavelength-division multiplexer 32A and 32A'; the circuit arrangement of FIG. 11 operates in the same manner as that of FIG. 10, and the sine/cosine processor 72 produces output signals 154A . . . 154N that are representative of the amount each of the unique wavelength components of the Bragg gratings 12A . . . 12N' is altered, relative to wavelength $\lambda$ when subjected to perturbations, and similarly, the sine/cosine processor 72' produces output signals 154A' . . . 154N' representative of the amount each of the unique wavelength components of the Bragg gratings 12A . . . 12N' is altered relative to the wavelength $\lambda$ when subjected to perturbations.

It should now be appreciated that the practice of the present invention provides for various embodiments that allow for the use of at least 400 sensors, although it is contemplated that the number (400) is not even a practical limit. The practice of the present invention further provides for various sensors that may be used to detect acoustical emissions, electrical field disturbances or magnetic field disturbances. Further, the practice of the present invention provides for the use of multiple sensors for monitoring the performance of a selected piece of equipment using fiber Bragg grating (FBG) sensors and does so without the need of any complex filtering schemes, or without the need of any ratiometric approaches previously discussed in the "Background" section.

It should, therefore, readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A system for detecting perturbations to which a piece of equipment is being subjected thereto, said system comprising:
   (a) an optical sensor placed along said piece of equipment and having a plurality of reflective Bragg gratings induced in the sensor and each grating acting as a sensor element, each grating having a unique location along said piece of equipment and a unique wavelength component for reflecting incident light, each of said unique wavelength components of said sensor elements being altered when being subjected to perturbations;
   (b) a light source for providing input light to said sensor to cover all of said wavelength components so as to reflect incident light from each of said gratings;
   (c) an unbalanced interferometer for receiving said reflected incident light from each of said gratings, said unbalanced interferometer having first and second arms and generating an interferometric signal for each wavelength component of said incident light reflected by each of said Bragg gratings;
   (d) means for generating a modulation signal;
   (e) a phase modulator for receiving said modulation signal, said phase modulator being placed in one of said arms of said unbalanced interferometer, said phase modulator modulating each of said interferometric signals; and
   (f) a demodulator for receiving each of said modulated interferometric signals and producing output signals representative of the amount each of said unique wavelength components of said reflected incident light is altered when subjected to said perturbations.

2. The system for detecting perturbations according to claim 1, wherein said unique wavelength components of said plurality of Bragg gratings are separated from each other by a wavelength of about 1 nm.

3. The system for detecting perturbations according to claim 1, wherein said sensor is selected from the group consisting of a free-field sensor, a diaphragm sensor, an accelerometer type, a magnetostrictive type, an electrostrictive type, and a piezoelectric type.

4. The system for detecting perturbations according to claim 1, wherein said light source comprises a first broadband source of the type selected from the group comprising an edge-emitting LED (ELED), a superluminescent diode, a superluminescent fiber source and a fiber Erbium source.

5. The system for detecting perturbations according to claim 4, wherein said light source further comprises a second broadband source of the type selected from the group comprising an edge-emitting LED (ELED), a superluminescent diode, a superluminescent fiber source and a fiber Erbium source, and wherein said first and second broadband sources have operating wavelengths of about 1.3 μm and 1.55 μm respectively, and each of said first and second broadband sources has a bandwidth of about 50 nm.

6. The system for detecting perturbations according to claim 1, wherein said demodulator comprises:
   (a) means for receiving each of said modulated interferometric signals and splitting each into signals representative of said unique wavelength components;
   (b) detection means responsive to each of said split unique wavelength components and producing corresponding sine and cosine signals; and
   (c) signal processor means responsive to said modulation signal and also responsive to said sine and cosine signals and producing said demodulator output signals.

7. The system for detecting perturbations according to claim 1, wherein said demodulator comprises:
   (a) means for producing a pulse having a predetermined pulse duration and which is applied along with said input light to said sensor;
   (b) means for receiving each of said modulated interferometric signals and splitting each into signals representative of said unique wavelength components;
   (c) detection means responsive to each of said split unique wavelength components and producing corresponding sine and cosine signals;
   (d) gating means for receiving said corresponding sine and cosine signals and being responsive to said pulse to provide said sine and cosine signals as output signals thereof; and
   (e) signal processor means responsive to said modulation signal and also being responsive to said output sine and cosine signals of said gating means and producing said demodulator output signals.

8. The system for detecting perturbations according to claim 7, wherein said plurality of reflective Bragg gratings are separated by a fiber delay device into two arrays each of which array has Bragg gratings with unique wavelength components that match each other.

9. A system for detecting perturbations to which a piece of equipment is being subjected thereto, said system comprising:
   (a) an optical sensor placed along said piece of equipment and having a plurality of reflective Bragg gratings induced in the sensor and each grating acting as a sensor element, each grating having a unique location along said piece of equipment and a unique wavelength component for reflecting incident light, each of said unique wavelength components of said optical sensor being altered when being subjected to perturbations;
   (b) a first light source for providing input light to said sensor at a first operating wavelength λ having a bandwidth that covers all of said wavelength components so as to reflect incident light from each of said gratings;
   (c) a second light source for providing input light to said sensor at a second operating wavelength λ having a bandwidth that covers all of said wavelength components so as to reflect incident light from each of said gratings;
   (d) a first unbalanced interferometer having an operating wavelength corresponding to said wavelength λ and receiving said reflected incident light from each of said Bragg gratings, said first unbalanced interferometer having first and second arms and generating an interferometric signal for each wavelength component of said incident light reflected by each of said Bragg gratings;
   (e) a second unbalanced interferometer having an operating wavelength corresponding to said wavelength λ' and receiving reflected light from each of said Bragg gratings, said second unbalanced interferometer having first and second arms and generating an interferometric signal for each wavelength component of said incident light reflected by each of said Bragg gratings;
   (f) means for generating a modulation signal;
   (g) a first phase modulator for receiving said modulation signal, said first phase modulator being placed in one of said arms of said first unbalanced interferometer, said first phase modulator modulating each of said interferometric signals of said first unbalanced interferometer;

(h) a second phase modulator for receiving said modulation signal, said second phase modulator being placed in one of said arms of said second unbalanced interferometer, said second phase modulator modulating each of said interferometric signals of said second unbalanced interferometer;

(i) a first demodulator for receiving each of said modulated interferometric signals from said first unbalanced interferometer and producing output signals representative of the amount each of said unique wavelength components of said reflected incident light is altered relative to said wavelength $\lambda$ when subjected to said perturbations; and (j) a second demodulator for receiving each of said modulated interferometric signals from said second unbalanced interferometer and producing output signals representative of the amount each of said unique wavelength components of said reflected incident light is altered relative to said wavelength $\lambda'$ when subjected to said perturbations.

10. The system for detecting perturbations according to claim 9, wherein said unique wavelength components of said plurality of Bragg gratings are separated from each other by a wavelength of about 1 nm.

11. The system for detecting perturbations according to claim 9, wherein said sensor is selected from the group consisting of a free-field sensor, a diaphragm sensor, an accelerometer type, a magnetostrictive type, an electrostrictive type, and a piezoelectric type.

12. The system for detecting perturbations according to claim 9, wherein said first and second light sources are each of the type selected from the group comprising an edge-emitting LED (ELED), a superluminescent diode, a superluminescent fiber source, and a fiber Erbium source, and wherein said first and second broadband sources have operating wavelengths of about 1.3 µm and 1.55 µm, respectively, and each of said first and second broadband sources has a bandwidth of about 50 nm.

13. The system for detecting perturbations according to claim 9, wherein said first demodulator comprises:

(a) first means for receiving each of said modulated interferometric signals from said first unbalanced interferometer and splitting each into signals representative of said unique wavelength components of said Bragg gratings;

(b) first detection means responsive to each of said split unique wavelength components of said first means and producing corresponding sine and cosine signals; and (c) first signal processor means responsive to said modulation signal and also responsive to said sine and cosine signals of said first detection means and producing said first demodulator output signals.

14. The system for detecting perturbations according to claim 9, wherein said second demodulator comprises:

(a) second means for receiving each of said modulated interferometric signals from said second unbalanced interferometer and splitting each into signals representative of said unique wavelength components of said Bragg gratings;

(b) second detection means responsive to each of said unique wavelength components of said second means and producing corresponding sine and cosine signals; and (c) second signal processor means responsive to said modulation signal and also responsive to said sine and cosine signals of said second detection means and producing said second demodulator output signals.

15. The system for detecting perturbations according to claim 9, wherein said first demodulator comprises:

(a) means for producing a pulse having a predetermined pulse duration that is applied with said input light of said first and second light sources to said optical sensor;

(b) first means for receiving each of said modulated interferometric signals from said first unbalanced interferometer and splitting each into signals representative of said unique wavelength components;

(c) first detection means responsive to each of said split unique wavelength components of said first means and producing corresponding sine and cosine signals;

(d) first gating means for receiving said corresponding sine and cosine signals of said first detection means and being responsive to said pulse to provide said sine and cosine signals as output signals thereof; and (e) first signal processor means responsive to said modulation signal and also being responsive to said output sine and cosine signals of said first gating means for producing said first demodulator output signals.

16. The system for detecting perturbations according to claim 9, wherein said second demodulator comprises:

(a) means for producing a pulse having a predetermined pulse duration that is applied with said input light of said first and second light sources to said optical sensor;

(b) second means for receiving each of said modulated interferometric signals from said second unbalanced interferometer and splitting each into signals representative of said unique wavelength components;

(c) second detection means responsive to each of said unique wavelength components of said second means and producing corresponding sine and cosine signals;

(d) second gating means for receiving said corresponding sine and cosine signals of said second detector means and being responsive to said pulse to provide said sine and cosine signals as output signals thereof; and (e) second signal processor means responsive to said modulation signal and also being responsive to said output sine and cosine signals of said second gating means and producing said second demodulator output signals.

17. The system for detecting perturbations according to claim 9, wherein said plurality of reflective Bragg gratings are separated by a fiber delay device into two arrays each of which array has the same gratings with a unique location and the same unique wavelength components.

* * * * *